United States Patent
Natsumeda (10) Patent No.: US 11,669,771 B2
(45) Date of Patent: Jun. 6, 2023

(54) LEARNING SYSTEM, ANALYSIS SYSTEM, LEARNING METHOD, AND STORAGE MEDIUM

(71) Applicant: NEC CORPORATION, Tokyo (JP)

(72) Inventor: Masanao Natsumeda, Tokyo (JP)

(73) Assignee: NEC CORPORATION, Tokyo (JP)

(*) Notice: Subject to any disclaimer, the term of this patent is extended or adjusted under 35 U.S.C. 154(b) by 641 days.

(21) Appl. No.: 16/629,093

(22) PCT Filed: Jul. 13, 2017

(86) PCT No.: PCT/JP2017/025559
§ 371 (c)(1),
(2) Date: Jan. 7, 2020

(87) PCT Pub. No.: WO2019/012653
PCT Pub. Date: Jan. 17, 2019

(65) Prior Publication Data
US 2020/0193325 A1 Jun. 18, 2020

(51) Int. Cl.
*G06N 20/00* (2019.01)
*G06F 16/28* (2019.01)

(52) U.S. Cl.
CPC .......... *G06N 20/00* (2019.01); *G06F 16/285* (2019.01)

(58) Field of Classification Search
CPC .............................. G06N 20/00; G06F 16/285
See application file for complete search history.

(56) References Cited

U.S. PATENT DOCUMENTS

| 8,731,724 B2* | 5/2014 | Drees ................ H02J 13/00004 714/48 |
| 9,626,600 B2 | 4/2017 | Liu et al. |
| 9,779,495 B2 | 10/2017 | Shibuya et al. |

(Continued)

FOREIGN PATENT DOCUMENTS

| JP | 6-174503 A | 6/1994 |
| JP | 2014-085948 A | 5/2014 |

(Continued)

OTHER PUBLICATIONS

Bosman, Elsevier, 2016, pp. 41-56.*

(Continued)

*Primary Examiner* — Michael I Ezewoko
(74) *Attorney, Agent, or Firm* — Sughrue Mion, PLLC (57) ABSTRACT

A learning system including: a training data acquisition unit that, for each of a plurality of feature amounts obtained by converting time-series data on a predetermined period basis, acquires training data with which an event type in the predetermined period is associated; and a classifier learning unit that performs learning on a plurality of classifiers different from each other by using a feature amount group including one or more feature amounts corresponding to some or all periods out of the plurality of feature amounts included in the training data to perform learning on a classifier, which classifies the event type, for multiple times while changing a combination in the feature amount group, and the event type includes a first event type corresponding to a state where a target event to be classified occurs and a second event type corresponding to a state where the target event does not occur.

12 Claims, 6 Drawing Sheets

(56) References Cited

U.S. PATENT DOCUMENTS

| | | | |
|---|---|---|---|
| 2012/0041575 A1* | 2/2012 | Maeda | G05B 23/024 |
| | | | 700/79 |
| 2012/0271587 A1 | 10/2012 | Shibuya et al. | |
| 2013/0054816 A1* | 2/2013 | Gurbani | H04L 69/22 |
| | | | 709/227 |
| 2015/0220847 A1 | 8/2015 | Shibuya et al. | |
| 2016/0202693 A1 | 7/2016 | Noda et al. | |
| 2016/0210535 A1 | 7/2016 | Takimoto | |

FOREIGN PATENT DOCUMENTS

| | | |
|---|---|---|
| JP | 2014-142697 A | 8/2014 |
| JP | 2014-170282 A | 9/2014 |
| JP | 2014-235603 A | 12/2014 |
| JP | 2015-148867 A | 8/2015 |
| JP | 5769138 B2 | 8/2015 |
| JP | 2016-128973 A | 7/2016 |
| JP | 2016-133895 A | 7/2016 |
| JP | 2016-157170 A | 9/2016 |
| JP | 2017-102765 A | 6/2017 |
| WO | 2011/043108 A1 | 4/2011 |

OTHER PUBLICATIONS

Fisher, Elsevier, 2016, pp. 143-153.*
Pang, 2017, Elsevier, pp. 280-292.*
International Search Report for PCT/JP2017/025559 dated Aug. 8, 2017 [PCT/ISA/210].

* cited by examiner

LEARNING SYSTEM, ANALYSIS SYSTEM, LEARNING METHOD, AND STORAGE MEDIUM

CROSS REFERENCE TO RELATED APPLICATIONS

This application is a National Stage of International Application No. PCT/JP2017/025559 filed Jul. 13, 2017.

TECHNICAL FIELD

The present invention relates to a learning system, an analysis system, a learning method, and a storage medium.

BACKGROUND ART

Various studies regarding an anomaly detection scheme used for management of a plant or the like have been made. An integrated alert data management apparatus of Patent Literature 1 has a data management unit that can search a work plan database in which work targets and alert targets are associated with each other. Further, the integrated alert data management apparatus has an output processing unit that distinguishes between alert-related data caused by work and other alert-related data based on work plan data and displays a result of the distinguishing operation on a display device. This display enables an operator to easily determine whether an alert is caused by inspection work or the like or caused by an anomaly of a plant facility.

A plant monitoring apparatus of Patent Literature has an inspection execution signal input unit to which an inspection execution signal that identifies the attribute of inspection work is input from a plant when inspection work is implemented. In accordance with whether or not an inspection execution signal is input, it is possible to determine whether or not an anomaly of a process signal is caused by inspection when the anomaly is detected, and it is therefore possible to reduce a workload for anomaly analysis.

CITATION LIST

Patent Literature

PTL 1: Japanese Patent Application Laid-Open No. 2014-170282
PTL 2: Japanese Patent Application Laid-Open No. 2014-235603

SUMMARY OF INVENTION

Technical Problem

The arts disclosed in Patent Literature 1 and Patent Literature 2 may require not only to distinguish between inspection work and abnormal operation but also to associate data used for distinguishing between normal operation and abnormal operation. Thus, there may be a problem of a large management burden.

The present invention has been made in view of the above problem and intends to provide a learning system, an analysis system, a learning method, and a storage medium that can reduce a management burden.

Solution to Problem

According to one example aspect of the present invention, provided is a learning system including: a training data acquisition unit that, for each of a plurality of feature amounts obtained by converting time-series data on a predetermined period basis, acquires training data with which an event type in the predetermined period is associated; and a classifier learning unit that performs learning on a plurality of classifiers that are different from each other by using a feature amount group including one or more feature amounts corresponding to some or all of periods out of the plurality of feature amounts included in the training data to perform an operation of performing learning on a classifier, which classifies the event type, for multiple times while changing a combination in the feature amount group, and the event type includes a first event type corresponding to a state where a target event to be classified is occurring and a second event type corresponding to a state where the target event is not occurring.

Advantageous Effects of Invention

According to the present invention, a learning system, an analysis system, a learning method, and a storage medium that can reduce a management burden can be provided.

DESCRIPTION OF EMBODIMENTS

Example embodiments of the present invention will be described below with reference to the drawings. Note that, throughout the drawings described below, elements having the same function or a corresponding function are labeled with the same reference, and the repeated description thereof may be omitted.

First Example Embodiment

Figure 1:
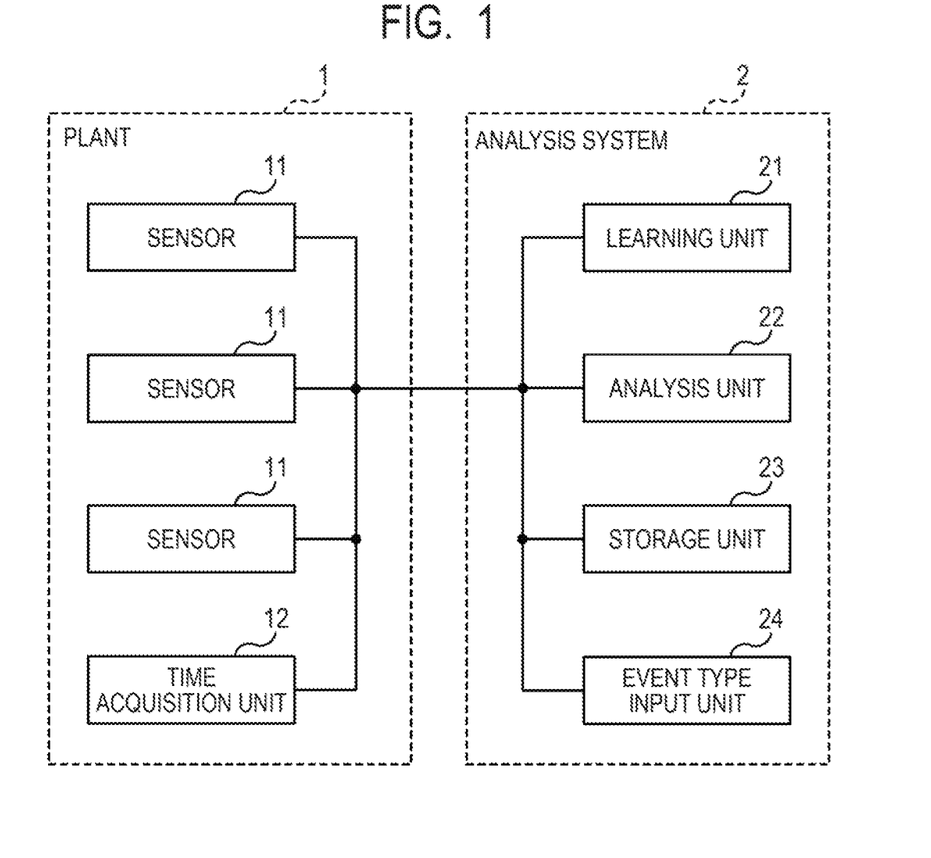
FIG. 1 is a schematic block diagram illustrating the entire configuration of a plant and an analysis system according to a first example embodiment of the present invention.

An analysis system 2 according to a first example embodiment of the present invention will be described. First, a general configuration including the analysis system 2 according to the present example embodiment and a plant 1 that is an analysis target will be described by using FIG. 1. FIG. 1 is a schematic block diagram illustrating the entire configuration of the plant 1 and the analysis system 2 according to the present example embodiment.

As illustrated in FIG. 1, the analysis system 2 that analyzes the state of the plant 1 is communicably connected to the plant 1 by wire or wirelessly. The plant 1 may be, for example, a chemical plant, a power plant, a medicine factory, an assembly factory, or the like. The analysis system 2 may be, for example, a monitoring apparatus of the plant 1.

In the plant 1, a plurality of sensors 11 for monitoring the state of apparatus installed inside the plant 1, the state of a fluid flowing in a piping, or the like and a time acquisition unit 12 are provided. The sensors 11 may be, for example, a temperature sensor, a humidity sensor, a pressure sensor, a flowrate sensor, or the like. While three sensors 11 are depicted in FIG. 1, this is exemplary illustration, and any number of sensors 11 may be provided.

The time acquisition unit 12 acquires the current time used for determining output data of the plurality of sensors 11 as time-series data associated with data output time. The time acquisition unit 12 may be a real-time clock provided in a control device of the plurality of sensors 11, for example. With such a configuration, the plant 1 supplies time-series data based on the output of the plurality of sensors 11 to the analysis system 2. Such time-series data may be, for example, time-series data of measurement values of a temperature, a humidity, or the like inside an apparatus provided within the plant 1, time-series data of measurement values of a pressure, a flowrate, or the like inside a piping provided within the plant 1, or the like. Note that, while the configuration in which a single time acquisition unit 12 is provided to the plurality of sensors 11 as illustrated in FIG. 1 may be employed, a configuration in which a plurality of time acquisition units 12 corresponding to the plurality of sensors 11 are provided may be employed. Further, the time acquisition unit 12 may be provided on the analysis system 2 side.

The analysis system 2 has a learning unit 21, an analysis unit 22, a storage unit 23, and an event type input unit 24. The storage unit 23 stores time-series data output from the plant 1 as data indicating the state of the plant 1. The event type input unit 24 is an input interface that associates the type of an event occurring in the plant 1 with each period of time-series data partitioned into predetermined periods. Such association of an event type is input by a manager of the analysis system 2. Accordingly, the storage unit 23 stores time-series data with which an event type is associated. Note that "event" means a state of the plant 1 at each time. For example, a state where inspection work on a facility, a piping, or the like is performed by an inspection worker within the plant 1, a state where manual work on a facility is performed by a worker, or the like is one type of "event". Further, as described later, a normal operation state and an abnormal operation state are included in "event".

The learning unit 21 converts time-series data stored in the storage unit 23 into a feature amount and uses this feature amount and an event type associated therewith as training data to perform machine learning on a plurality of classifiers. In the present specification, machine learning may be simply referred to as learning. A plurality of trained classifiers are stored in the storage unit 23, for example. The analysis unit 22 converts time-series data stored in the storage unit 23 into a feature amount, uses a plurality of classifiers obtained by learning in the learning unit 21 to classify an event corresponding to the feature amount, and determines an event occurring in the plant 1. The analysis system 2 of the present example embodiment can automatically determine the event type (for example, normal operation, inspection work, abnormal operation, or the like) that occurred in the plant 1 and can perform anomaly detection or the like of the plant 1.

The configuration illustrated in FIG. 1 is one example, the configuration can be changed if necessary as long as time-series data obtained in the plant 1 can be analyzed. For example, the analysis system 2 may be configured to be provided inside the plant 1 or may be configured such that the learning unit 21 is provided outside the analysis system 2 as a learning system.

Figure 2:
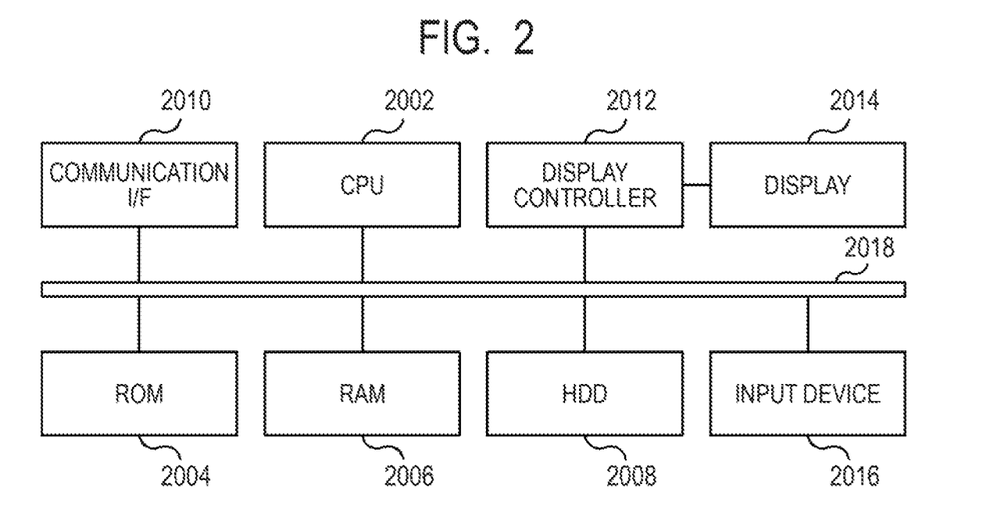
FIG. 2 is a block diagram illustrating a hardware configuration example of the analysis system according to the first example embodiment of the present invention.

A hardware configuration example of the analysis system according to the present example embodiment will be described by using FIG. 2. FIG. 2 is a block diagram illustrating a hardware configuration example of the analysis system 2 according to a second example embodiment. Note that the analysis system 2 may be formed of a single device or may be formed of two or more physically separate devices communicably connected by wire or wirelessly.

As illustrated in FIG. 2, the analysis system 2 has a central processing unit (CPU) 202, a read only memory (ROM) 2004, a random access memory (RAM) 2006, and a hard disk drive (HDD) 2008. Further, the analysis system 2 has a communication interface (I/F) 2010. Further, the analysis system 2 has a display controller 2012 and a display 2014. Furthermore, the analysis system 2 has an input device 2016. The CPU 2002, the ROM 2004, the RAM 2006, the HDD 2008, the communication I/F 2010, the display controller 2012, and the input device 2016 are connected to a common bus line 2018.

The CPU 2002 performs overall control and calculation processes of the analysis system 2. The CPU 2002 implements the function of each unit in the analysis system 2 by loading a program stored in the HDD 2008 or the like to the RAM 2006 and executing the program.

The ROM 2004 stores a program such as a boot program. The RAM 2006 is used as a working area when the CPU 2002 executes a program. Further, the HDD 2008 stores a program executed by the CPU 2002.

Further, the HDD 2008 is a storage device that implements a storage function in the analysis system 2, such as storage unit 23. Note that the storage device used in the analysis system 2 is not limited to the HDD 2008 as long as it is nonvolatile type and may be, for example, a flash memory or the like.

The communication I/F 2010 controls communication of data with the plant 1 via a network. The display 2014 that provides the function as a display unit is connected to the display controller 2012. The display controller 2012 functions as an output unit together with the CPU 2002 that outputs data regarding an image to be displayed, and an image based on the output data is displayed on the display 2014.

The input device 2016 is a hardware component such as a keyboard, a mouse, or the like by which the user performs entry to the event type input unit 24. The input device 2016 may be a touchscreen embedded in the display 2014. The manager of the analysis system 2 may input an event type to the analysis system 2, input an execution instruction of a process, or the like via the input device 2016.

Note that the hardware configuration of the analysis system 2 is not limited to the configuration described above and may be various configurations.

Figure 3:
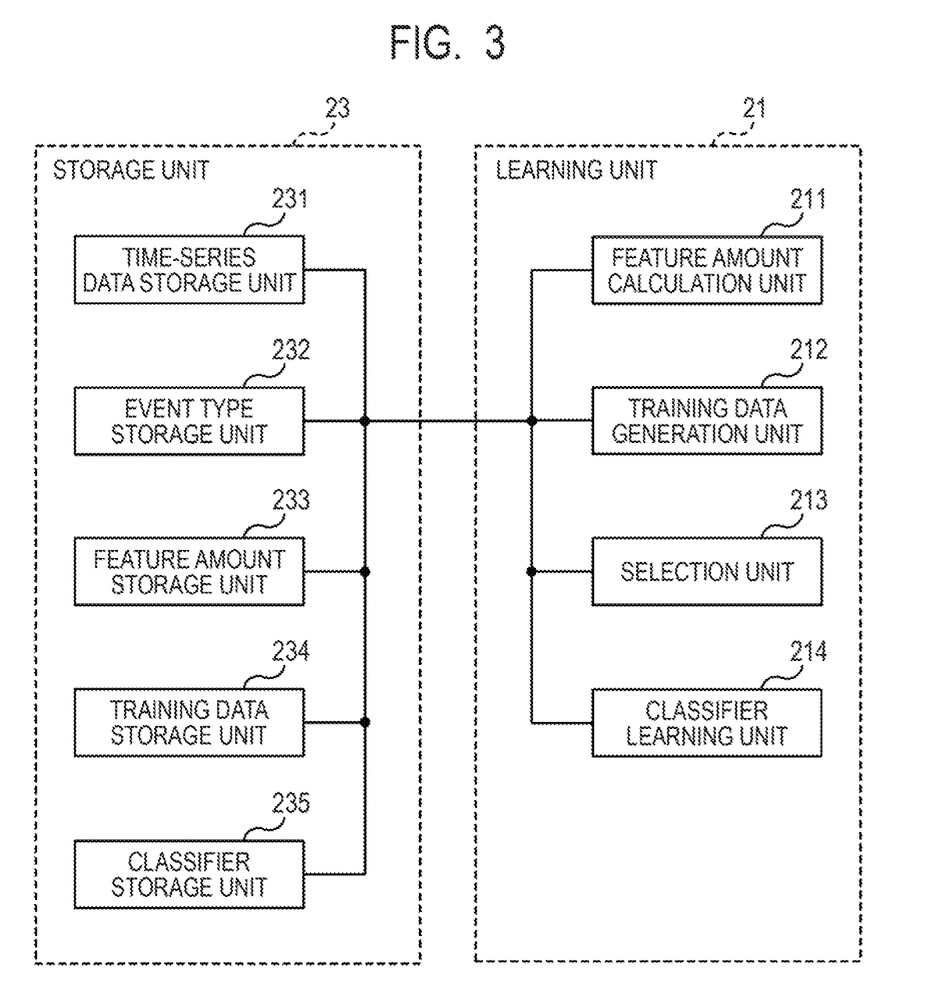
FIG. 3 is a block diagram illustrating a function configuration of a learning unit and a storage unit according to the first example embodiment of the present invention.
Figure 4:
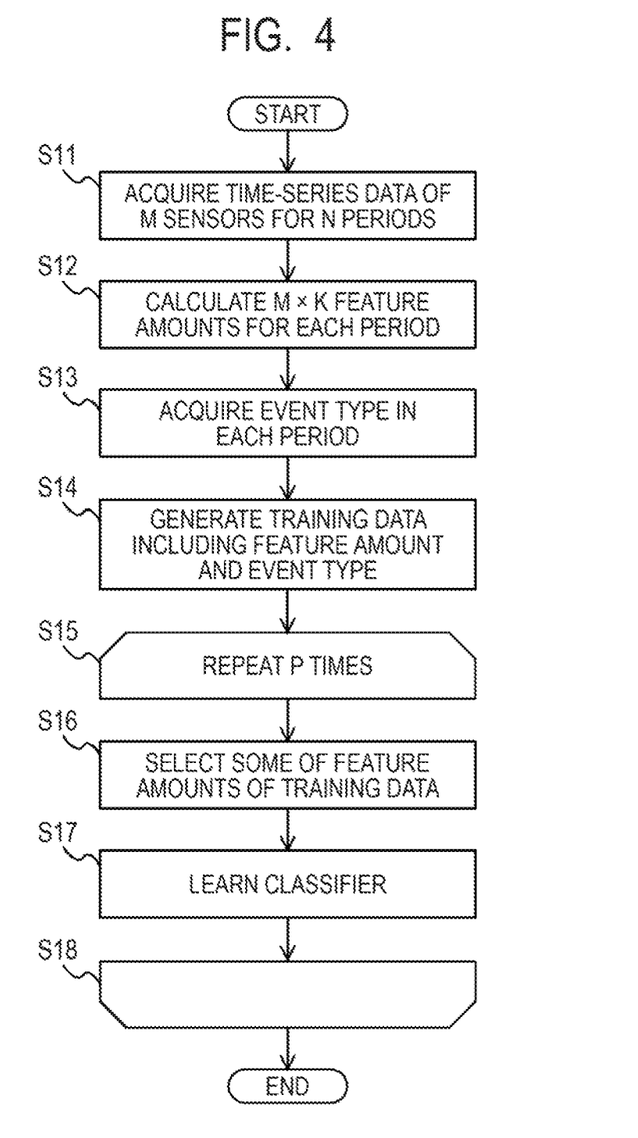
FIG. 4 is a flowchart illustrating a learning operation on a classifier according to the first example embodiment of the present invention.
Figure 5:
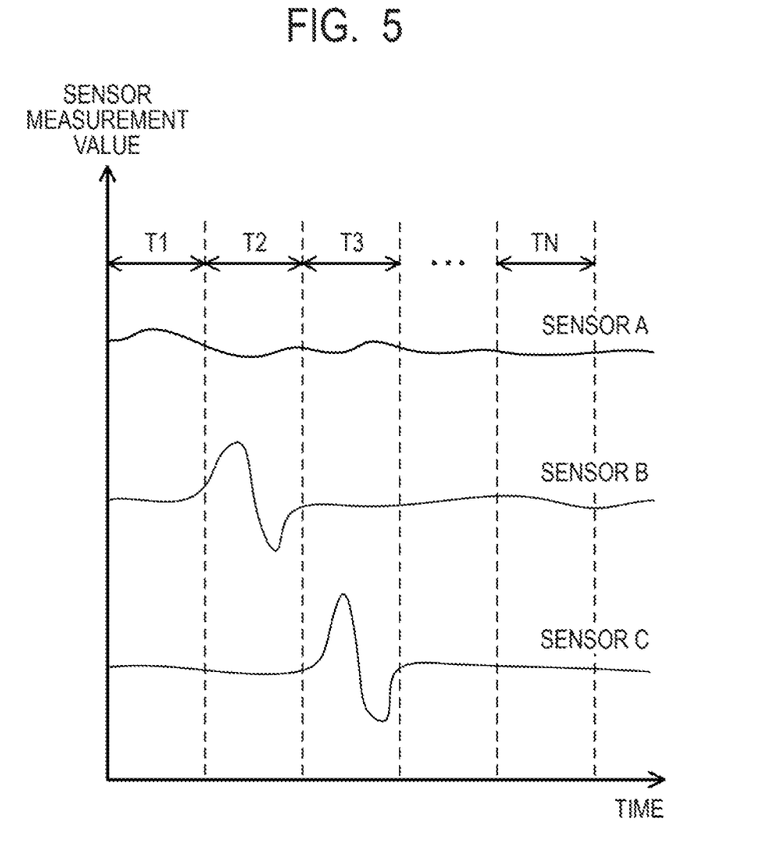
FIG. 5 is a graph illustrating an example of time-series data according to the first example embodiment of the present invention.
Figure 6:
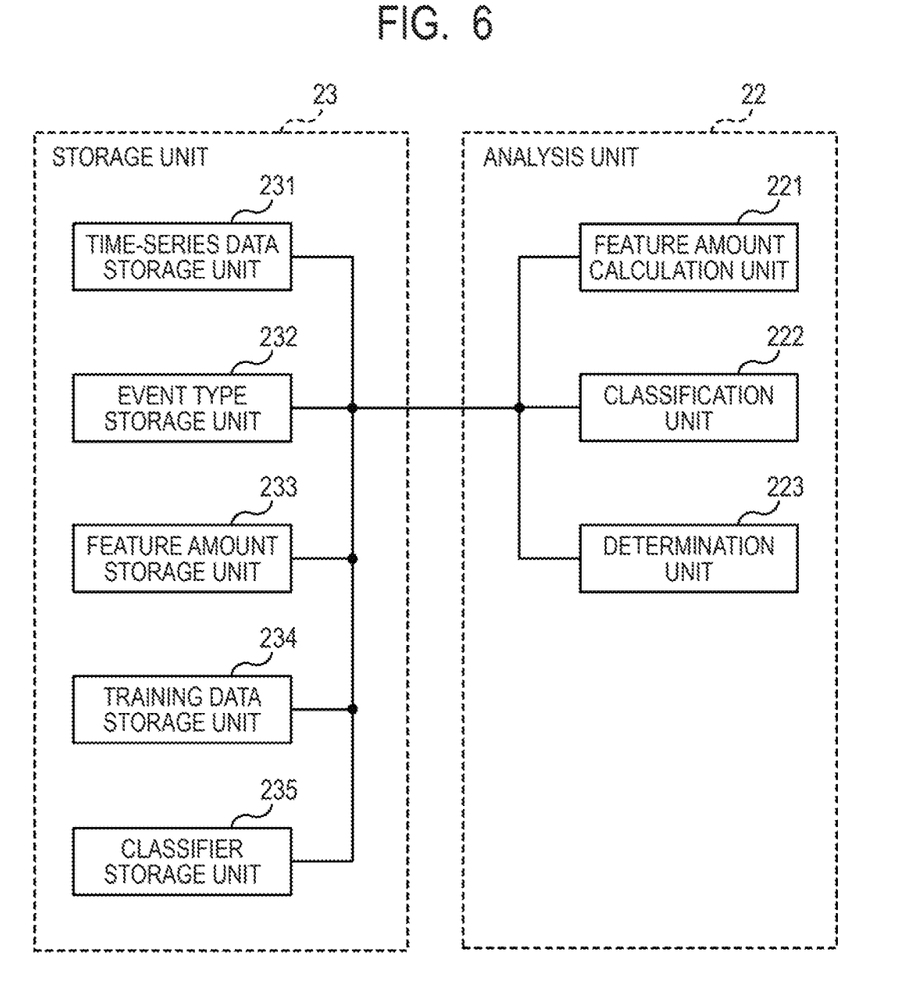
FIG. 6 is a block diagram illustrating a function configuration of an analysis unit and the storage unit according to the first example embodiment of the present invention.
Figure 7:
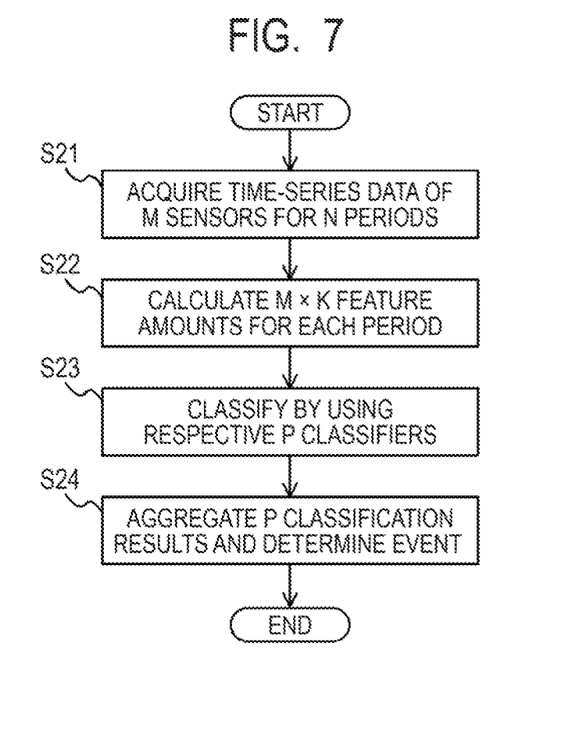
FIG. 7 is a flowchart illustrating an event determination operation according to the first example embodiment of the present invention.

Next, with cross reference to FIG. 3 to FIG. 7, learning on a classifier and determination of an event in the present example embodiment will be described. FIG. 3 is a block diagram illustrating a function configuration of the learning unit 21 and the storage unit 23 according to the present example embodiment. FIG. 4 is a flowchart illustrating a learning operation on a classifier according to the present example embodiment. FIG. 5 is a graph illustrating an example of time-series data according to the present example embodiment. FIG. 6 is a function block diagram of the analysis unit 22 and the storage unit 23 according to the present example embodiment. FIG. 7 is a flowchart illustrating an event determination operation according to the present example embodiment.

The learning operation on a classifier according to the present example embodiment will be described with reference to FIG. 3, FIG. 4, and FIG. 5. As illustrated in FIG. 3, the learning unit 21 has a feature amount calculation unit 211, a training data generation unit 212, a selection unit 213, and a classifier learning unit 214. The storage unit 23 has a time-series data storage unit 231, an event type storage unit 232, a feature amount storage unit 233, a training data storage unit 234, and a classifier storage unit 235.

In step S11 of FIG. 4, the analysis system 2 acquires time-series data output from the plurality of sensors 11 and stores the acquired time-series data in the time-series data storage unit 231. Note that the operation of step S11 may be performed in advance with such a scheme that performs the operation in real-time at the time of measurement by the sensor 11, for example.

An example of time-series data will be described. FIG. 5 illustrates three examples of temporal fluctuations of measurement values of the sensors 11. The vertical axis of the graph of FIG. 5 is a measurement value of the sensor 11, and the unit thereof is arbitrary. The horizontal axis of the graph of FIG. 5 is time acquired by the time acquisition unit 12. As illustrated in FIG. 5, time-series data is partitioned into N predetermined periods (T1, T2, T3, . . . , TN). Data of respective spans are handled as N separate data, and when the number of sensors 11 is M, it can be said that time-series data stored in the time-series data storage unit 231 includes Z=N×M data (N is an integer not less than two, and M is an integer not less than one).

Note that, when a measurement value measured by the sensor 11 is stored in the time-series data storage unit 231, the measurement value is converted into digital data so as to be suitable for conversion of a feature amount described later. Specifically, processing such as sampling, quantizing, or the like is performed on time-series data of measurement values measured by the sensor 11, and the time-series data is converted into digital data by an analog-to-digital converter (not illustrated).

In step S12, the feature amount calculation unit 211 reads time-series data stored in the time-series data storage unit 231 and calculates one or a plurality of feature amounts. Here, an example of a calculated feature amount may be a statistic such as a variance, a standard deviation, a difference (range) between the maximum value and the minimum value, a slope, an average, or the like of measurement values measured by the sensor 11 within a period of interest (for example, within the period T1). When the number of feature amounts calculated for each one set of data is K (K is an integer not less than one), the number of calculated feature amounts is M×K for each of the N periods, that is, N×M×K in total. The calculated feature amounts are stored in the feature amount storage unit 233.

In step S13, the event type input unit 24 of the analysis system 2 accepts input of an event type corresponding to each period. The input event type is stored in the event type storage unit 232. Here, the input of the event type may be made by the manager inputting an event intended to be a classification target (target event) and the occurrence time thereof to the event type input unit 24, for example. The number of types of target events to be input may be plural. When a plurality of overlapped target events (assumed to be a target event A and a target event B) occur at the same time, this may be handled as there being an occurrence of a target event C that is different from the target event A and the target event B.

Here, a time range in which the manager did not input an occurrence of any event, for example, a time period in which the plant 1 was in normal operation is handled as there being an occurrence of a different type of event from a target event. Such an event is referred to as a non-target event. That is, when the target event A and the target event B are defined as target events, the event type results in three types of the target event A, the target event B, and a non-target event X. Further, a target event may be referred to as a first event type, and a non-target event may be referred to as a second event type.

In step S14, the training data generation unit 212 generates data in which feature amounts stored in the feature amount storage unit 233 and event types stored in the event type storage unit 232 are associated based on respective time or periods. Such data is used as training data for supervised machine learning on a classifier. The generated training data is stored in the training data storage unit 234.

Then, the loop from step S15 to step S18 is repeated for P times (P is an integer not less than two). In step S16, the selection unit 213 classifies, out of training data stored in the training data storage unit 234, data of the M sensors 11 in the N periods, that is, Z=N×M data for each event type and selects a feature amount group corresponding to some or all of the periods for respective event types. For example, when three types, namely, the target event A, the target event B, and the non-target event X are present, selection is performed on each of the target event A, the target event B, and the non-target event X. Here, when a plurality of feature amounts are calculated for one of the Z=N×M data in step S12 (when K is plural), K feature amounts are selected to be included in a feature amount group as a set. In such a way, the feature amount group selected in this step includes N1×M×K feature amounts calculated for respective K feature amounts from the data of the M sensors obtained in some or all periods of the N periods (the number of these periods is denoted as N1).

In step S17, the classifier learning unit 214 uses the data of the feature amount group selected in step S16 to perform learning on the classifier. Here, the learning performed by the classifier learning unit 214 is the supervised machine learning. More specifically, such supervised machine learning that determines a feature amount in training data as data required for estimating classification and determines an event type as a correct answer (supervisor) to be estimated based on the feature amount is performed. A scheme used for the supervised machine learning may be, for example, a support vector machine, a random forest, a neural network, or the like.

Learning on one classifier is performed by step S16 and step S17. The trained classifier is stored in the classifier storage unit 235. The operations of step S16 and step S17 described above are repeated for P times, and learning on the P classifiers is performed. Here, in each of P times of step S16, selection is performed so that combinations of data included in a feature amount group to be selected are different from each other. Accordingly, the P classifiers to be generated are trained based on feature amount groups which are different from each other and thus serve as classifiers which are of the same type but have different classification criteria from each other.

The loop from step S15 to step S18 is repeated for P times, and upon completion of learning on the P classifiers, the learning operation on classifiers in accordance with the flowchart of FIG. 4 ends.

Next, the event determination operation according to the present example embodiment will be described with reference to FIG. 6 and FIG. 7. This operation is an operation to use the P classifiers obtained by the learning operation described above to determine an event that occurred in the plant 1 based on time-series data of the sensor 11. As illustrated in FIG. 6, the analysis unit 22 has a feature amount calculation unit 221, a classification unit 222, and a determination unit 223. Since the configuration of the storage unit 23 is the same as that of FIG. 3, the description thereof will be omitted.

In step S21 of FIG. 7, the analysis system 2 acquires time-series data output from the plurality of sensors 11 and stores the acquired time-series data in the time-series data storage unit 231. Note that the operation of step S21 may be performed in advance with such a scheme that performs the operation in real-time at the time of measurement by the sensor 11, for example. Note that the combination of the plurality of sensors 11 that acquire time-series data is the same as the combination of the plurality of sensors 11 used for generating training data described above.

In step S22, the feature amount calculation unit 221 reads time-series data stored in the time-series data storage unit 231 and calculates one or a plurality of feature amounts. Here, the type, the number, and the like of the feature amount to be calculated are the same as those of the training data described above. Since this process is the same as step S12 of FIG. 4, detailed description thereof will be omitted.

In step S23, the classification unit 222 uses each of the P classifiers stored in the classifier storage unit 235 to perform classification of event types in which feature amounts for respective periods stored in the feature amount storage unit 233 are input data. In response to input, each classifier outputs a result in which an event type is classified into event classification of either the target event or the non-target event defined at the time of learning.

In step S24, the determination unit 223 aggregates P event classification results respectively output by the P classifiers and determines an event that occurred in the plant 1 in each period. The P classifiers have different classification criteria and thus may output different classification results. Accordingly, to obtain one determination result, the P event classification results are aggregated at the time of determination to perform the determination. This determination is performed by majority logic that determines that an event corresponding to an event type classified by the most classifiers occurred in a classification target period, for example. In such a way, the analysis system 2 of the present example embodiment can determine an event that occurred in the plant 1 for each predetermined period based on time-series data obtained by the plurality of sensors 11. The analysis system 2 may store the event determination result as a log or may notify the manager of a message in accordance with the event determination result. The message in accordance with an event determination result may be display of a warning text on the display 2014, a notification by a sound, a light, or the like from an alert device (not illustrated), or the like.

The advantage of the present example embodiment will be described. In general, since the normal operation is an abstract concept, a large burden is required for defining a determination criterion used for determining whether or not operation is normal operation and inputting information indicating that the operation is normal operation. In contrast, in the operation of the analysis system 2 of the present example embodiment, the manager has only to input occurrence time of a target event and is not required to input information on normal operation, because normal operation is handled as a non-target event even when the time thereof is not input in particular. Further, similarly, an event that does not need to be classified can be handled as a non-target event even without input in particular. Therefore, the analysis system 2 of the present example embodiment can reduce information which has to be input by the manager and can reduce a management burden.

Since events other than the target event are handled as a non-target event as a whole without definition of normal operation, an event may not be correctly classified in some of the P classifiers for some learning status. However, the learning system of the present example embodiment can reduce influence of erroneous classification of some of the classifiers by using a plurality of classifiers having criteria different from each other to perform classification and aggregating the results thereof. Thus, the analysis system 2 as a whole can ensure sufficient determination performance.

Further, in the analysis system 2 of the present example embodiment, even when the number of event types to be classified increases or the like, the workload of the manager when update is needed is small. In the present example embodiment, since the classifier trained by the supervised machine learning is used, when the number of event types to be classified increases, the manager has only to update training data by inputting the event type and the occurrence time range after the increase and perform re-learning on the classifier. Therefore, no large management burden such as repair of the system or reconfiguration of the database is caused. Furthermore, no large management burden is required because it is not necessary to request additional work from the plant 1 side at the time of analysis.

As described above, according to the present example embodiment, a learning system, an analysis system, a learning method, and a storage medium that can reduce a management burden can be provided.

Note that, while the selection scheme of data in step S16 is not limited, it is desirable that selection be performed at random by using a randomized algorithm or the like so that different data are more reliably selected through P times of loop.

Further, in the selection in step S16, it is desirable to select a more number of feature amounts associated with a non-target event than the number of feature amounts associated with a target event from a feature amount group used for learning on one classifier. This is because, since a non-target event includes various behavior events, a large number of data will be required in order to perform sufficient learning.

Further, in the selection in step S16, it is desirable to select all the feature amounts associated with a target event and select some of the feature amounts associated with a non-target event with respect to the feature amounts used for learning on one classifier. Some of the target events occur less frequently. It may often be preferable to select all the target events having explicit classification in order to improve the performance of a classifier. On the other hand, since many data having various features are obtained for a non-target event, selecting all the non-target events may conversely reduce the performance of a plurality of classifiers as a whole, and it may be often preferable to select some of the non-target events. Note that, when selecting some of the feature amounts associated with a non-target event, it is desirable that the selection be performed at random by using a randomized algorithm or the like as described above.

Further, it is desirable for the feature amounts calculated in steps S12 and S22 to include at least the variance of time-series data in a predetermined period. This is because, when an important event occurs in the plant 1, temporal fluctuation of the measurement value measured by the sensor 11 is likely to be large, and characteristic behavior often appears in the variance in particular in various statistics.

Further, it is desirable that the calculation of feature amounts in steps S12 and S22 be performed based on time-series data corresponding to only at least one of the occurrence time and the end time of a target event. The measurement value measured by the sensor 11 may often fluctuate much at the occurrence time and the end time of a target event, and the fluctuation of the measurement value measured by the sensor 11 may often be not large during a period between the occurrence time and the end time. Thus, it is possible to perform more effective learning by using feature amounts obtained based on only at least one of the occurrence time and the end time indicating characteristic behavior to perform learning.

Further, while time-series data illustrated in FIG. 5 may be partitioned in any scheme, it is desirable that time-series data be partitioned by using periods that can divide a day into equal intervals in terms of easiness in application of the scheme. For example, a day is divided equally into 48 by sequentially setting periods at 30-minute intervals such that the period T1 is set to 0:00 to 0:30, the period T2 is set to 0:30 to 1:00, and so on. An event planned in advance such as inspection or the like in the plant 1 is often performed regularly at the same time every day and is often set at a regular hour such as at 2:00, at 4:30, or the like in terms of scheduling of work. To support such occurrence time of an event, it is desirable to partition periods which equally divide a day.

Further, in the selection in step S16, it is desirable to select, out of a set of feature amounts used for learning on one classifier, feature amounts associated with the non-target event in such a combination that includes all the feature amounts that are based on continuous time-series data for at least one day. The continuous time-series data of a day is typically time-series data for one day that starts from 0:00 on a day but may be time-series data that spans two days, such as from 18:00 on a day to 18:00 on the next day, as long as it is time-series data of continuous 24 hours. By selecting all the data of a day collectively, it is possible to reduce a likelihood of missing a feature of a non-target event occurring at predetermined time in a day or a non-target event occurring less frequently such as once a day, and it is thus possible to improve the performance of a classifier. For example, when inspection of a facility is planned at 4:00 every day in the plant 1, if selection excluding a period including 4:00 is made, the feature of this inspection of the facility will be missed. In contrast, with collective selection of data for a day, since inspection performed at 4:00 every day is not excluded, which can eliminate missing of this inspection.

Further, in the event determination in step S24, the event determination result may be rejected if the maximum value is less than or equal to a predetermined threshold. More specifically, an algorithm described below may be employed. If the maximum value of the number of classifiers that have performed classification into each event type is larger than a predetermined threshold, the determination unit 223 determines that an event corresponding to an event type classified by the most classifiers occurred in a classification target period. If the maximum value of the number of classifiers that have performed classification into each event type is smaller than or equal to a predetermined threshold, the determination unit 223 determines that no target event occurred in a classification target period. By doing so, it is possible to reject a less reliable determination result, and it is thus possible to improve the event determination performance.

Further, it is desirable that partitioning of predetermined periods in step S11 and partitioning of predetermined periods in step S21 be made in accordance with the same criterion. For example, when the partitioning of predetermined periods in step S11 is to divide a day equally into 48, it is desirable that the partitioning of predetermined periods in step S21 be to divide a day equally into 48 in the same manner. By applying the same way of partitioning periods to both the time of learning and the time of analysis, input data at the time of analysis becomes closer to input data at the time of learning, and it is therefore possible to improve the performance of a classifier.

Second Example Embodiment

Figure 8:
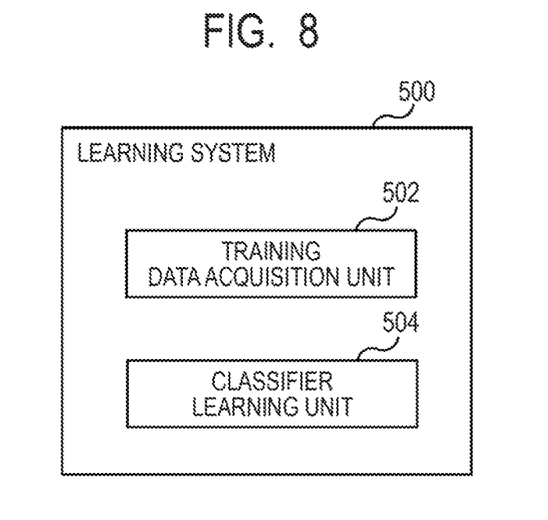
FIG. 8 is a block diagram illustrating a function configuration of a learning system according to a second example embodiment of the present invention.

The learning unit 21 of the analysis system 2 described above in the first example embodiment can also be configured as a learning system 500 as illustrated in FIG. 8 according to the second example embodiment. FIG. 8 is a block diagram of a function configuration of the learning system 500 according to the second example embodiment.

As illustrated in FIG. 9, the learning system 500 according to the second example embodiment has a training data acquisition unit 502 that acquires training data with which an event type in a predetermined period is associated for each of a plurality of feature amounts obtained by converting time-series data on a predetermined period basis. Further, the learning system 500 has a classifier learning unit 504 that performs learning on a plurality of classifiers that are different from each other by using a feature amount group including one or more feature amounts corresponding to some or all of the periods out of the plurality of feature amounts included in the training data to perform an operation of performing learning on a classifier, which classifies an event type, for multiple times while changing a combination in the feature amount group. Here, the event type described above includes a first event type corresponding to a state where a target event to be classified is occurring and a second event type corresponding to a state where the target event is not occurring. Accordingly, the learning system 500 that can reduce a management burden can be provided.

Modified Example Embodiment

While the present invention has been described above with reference to the example embodiments, the present invention is not limited to the example embodiments described above. Various modifications that can be understood by those skilled in the art can be made to the configuration and details of the present invention within the scope not departing from the spirit of the invention of the present application.

For example, in the example embodiments described above, time-series data may be a control signal of a device instead of an output value from the sensor 11. In such a case, the control signal may not be an analog signal as illustrated in FIG. 5 and may be a binary digital value, for example. In such a way, the present invention may also be applied to monitoring for control of a device.

The scope of each of the example embodiments further includes a processing method that stores, in a storage medium, a program that causes the configuration of each of the example embodiments to operate so as to implement the function of each of the example embodiments described above, reads the program stored in the storage medium as a code, and executes the program in a computer. That is, the scope of each of the example embodiments also includes a computer readable storage medium. Further, each of the example embodiments includes not only the storage medium in which the computer program described above is stored but also the computer program itself.

As the storage medium, for example, a floppy (registered trademark) disk, a hard disk, an optical disk, a magneto-optical disk, a compact disk-read only memory (CD-ROM), a magnetic tape, a nonvolatile memory card, or a ROM can be used. Further, the scope of each of the example embodiments includes an example that operates on Operating System (OS) to perform a process in cooperation with another software or a function of an add-in board without being limited to an example that performs a process by an individual program stored in the storage medium.

Further, a service implemented by the function of each of the example embodiments described above may be provided to a user in a form of Software as a Service (SaaS).

The whole or part of the example embodiments disclosed above can be described as, but not limited to, the following supplementary notes.

(Supplementary Note 1)
A learning system comprising:
a training data acquisition unit that, for each of a plurality of feature amounts obtained by converting time-series data on a predetermined period basis, acquires training data with which an event type in the predetermined period is associated; and
a classifier learning unit that performs learning on a plurality of classifiers that are different from each other by using a feature amount group including one or more feature amounts corresponding to some or all of periods out of the plurality of feature amounts included in the training data to perform an operation of performing learning on a classifier, which classifies the event type, for multiple times while changing a combination in the feature amount group,
wherein the event type includes a first event type corresponding to a state where a target event to be classified is occurring and a second event type corresponding to a state where the target event is not occurring.

(Supplementary Note 2)
The learning system according to supplementary note 1, wherein the feature amount group used for learning on the classifier is selected at random.

(Supplementary Note 3)
The learning system according to supplementary note 1 or 2, wherein out of the feature amount group used for learning on the classifier, the number of feature amounts associated with the second event type is larger than the number of feature amounts associated with the first event type.

(Supplementary Note 4)
The learning system according to any one of supplementary notes 1 to 3, wherein the classifier learning unit performs learning by using all of the feature amounts corresponding to the first event type out of the plurality of feature amounts and using some of the feature amounts corresponding to the second event type out of the plurality of feature amounts.

(Supplementary Note 5)
The learning system according to any one of supplementary notes 1 to 4, wherein the plurality of feature amounts include at least a variance of the time-series data in the predetermined period.

(Supplementary Note 6)
The learning system according to any one of supplementary notes 1 to 5, wherein the plurality of feature amounts include a feature amount based on time-series data corresponding to only at least one of occurrence time and end time of the target event.

(Supplementary Note 7)
The learning system according to any one of supplementary notes 1 to 6, wherein the time-series data is partitioned into periods which equally divide a day.

(Supplementary Note 8)
The learning system according to any one of supplementary notes 1 to 7, wherein the classifier learning unit performs learning by using a combination of feature amounts in which all of feature amounts based on continuous time-series data for at least one day are included with respect to feature amounts corresponding to the second event type out of the plurality of feature amount.

(Supplementary Note 9)
An analysis system comprising:
the learning system according to any one of supplementary notes 1 to 8; and
a classification unit that uses a plurality of classifier trained by the learning system to perform classification of an event type corresponding to a plurality of feature amounts in a classification target period.

(Supplementary Note 10)
The analysis system according to supplementary note 9, wherein the classification unit determines that an event corresponding to an event type classified by the most classifiers occurred in the classification target period.

(Supplementary Note 11)
The analysis system according to supplementary note 9, wherein the classification unit is configured to
determine that an event corresponding to an event type classified by the most classifiers occurred in the classification target period when the maximum number of classifiers that have performed classification into each event type is larger than a predetermined threshold, and
determine that the event does not occur in the classification target period when the maximum number of classifiers that have performed classification into each event type is smaller than or equal to the predetermined threshold.

(Supplementary Note 12)
A learning method comprising:
for each of a plurality of feature amounts obtained by converting time-series data on a predetermined period basis, acquiring training data with which an event type in the predetermined period is associated; and
performing learning on a plurality of classifiers that are different from each other by using a feature amount group including one or more feature amounts corresponding to some or all of periods out of the plurality of feature amounts included in the training data to perform an operation of performing learning on a classifier, which classifies the event type, for multiple times while changing a combination in the feature amount group,
wherein the event type includes a first event type corresponding to a state where a target event to be classified is occurring and a second event type corresponding to a state where the target event is not occurring.

(Supplementary Note 13)

A storage medium storing a program that causes a computer to perform a learning method comprising:

for each of a plurality of feature amounts obtained by converting time-series data on a predetermined period basis, acquiring training data with which an event type in the predetermined period is associated; and performing learning on a plurality of classifiers that are different from each other by using a feature amount group including one or more feature amounts corresponding to some or all of periods out of the plurality of feature amounts included in the training data to perform an operation of performing learning on a classifier, which classifies the event type, for multiple times while changing a combination in the feature amount group, wherein the event type includes a first event type corresponding to a state where a target event to be classified is occurring and a second event type corresponding to a state where the target event is not occurring.

REFERENCE SIGNS LIST 1 plant
2 analysis system
11 sensor
12 time acquisition unit
21 learning unit
22 analysis unit
23 storage unit
24 event type input unit
211, 221 feature amount calculation unit
212 training data generation unit
213 selection unit
214, 504 classifier learning unit
222 classification unit
223 determination unit
231 time-series data storage unit
232 event type storage unit
233 feature amount storage unit
234 training data storage unit
235 classifier storage unit
500 learning system
502 training data acquisition unit
2002 CPU
2004 ROM
2006 RAM
2008 HDD
2010 communication I/F
2012 display controller
2014 display
2016 input device
2018 bus line

The invention claimed is:

1. A learning system comprising:
at least one memory storing instructions; and
at least one processor configured to execute instructions to:
acquire, for each of a plurality of feature amounts obtained by converting time-series data on a predetermined period basis, training data with which an event type in the predetermined period is associated; and
perform learning on a plurality of classifiers that are different from each other by using a feature amount group including one or more feature amounts corresponding to some or all of periods out of the plurality of feature amounts included in the training data to perform an operation of performing learning on a classifier, which classifies the event type, for multiple times while changing a combination in the feature amount group, wherein the event type includes a first event type corresponding to a state where a target event to be classified is occurring and a second event type corresponding to a state where the target event is not occurring, wherein out of the feature amount group used for learning on the classifier, the number of feature amounts associated with the second event type is larger than the number of feature amounts associated with the first event type, wherein the learning is performed by using all of the feature amounts corresponding to the first event type out of the plurality of feature amounts and using some of the feature amounts corresponding to the second event type out of the plurality of feature amounts, and wherein the plurality of feature amounts include at least a variance of the time-series data in the predetermined period.

2. The learning system according to claim 1, wherein the feature amount group used for learning on the classifier is selected at random.

3. The learning system according to claim 1, wherein the plurality of feature amounts include a feature amount based on time-series data corresponding to only at least one of occurrence time and end time of the target event.

4. The learning system according to claim 1, wherein the time-series data is partitioned into periods which equally divide a day.

5. The learning system according to claim 1, wherein the learning is performed by using a combination of feature amounts in which all of feature amounts based on continuous time-series data for at least one day are included with respect to feature amounts corresponding to the second event type out of the plurality of feature amount.

6. An analysis system comprising:
the learning system according to claim 1; and
a plurality of classifiers, each trained by the learning system configured to perform classification of an event type corresponding to a plurality of feature amounts in a classification target period.

7. The analysis system according to claim 6, wherein the plurality of classifiers determine that an event corresponding to an event type classified by the most classifiers occurred in the classification target period.

8. The analysis system according to claim 6,
wherein the plurality of classifiers are configured to:
determine that an event corresponding to an event type classified by the most classifiers occurred in the classification target period when the maximum number of classifiers that have performed classification into each event type is larger than a predetermined threshold, and
determine that the event does not occur in the classification target period when the maximum number of classifiers that have performed classification into each event type is smaller than or equal to the predetermined threshold.

9. The learning system according to claim 1, wherein out of the feature amount group, the feature amounts associated with the second event type used for learning on the classifier is selected at random by using a randomized algorithm.

10. The learning system according to claim 1, wherein out of the feature amount group, the feature amounts associated with the second event type used for learning on the classifier is selected at random by using a randomized algorithm.

11. A learning method comprising:
- for each of a plurality of feature amounts obtained by converting time-series data on a predetermined period basis, acquiring training data with which an event type in the predetermined period is associated; and
- performing learning on a plurality of classifiers that are different from each other by using a feature amount group including one or more feature amounts corresponding to some or all of periods out of the plurality of feature amounts included in the training data to perform an operation of performing learning on a classifier, which classifies the event type, for multiple times while changing a combination in the feature amount group,
- wherein the event type includes a first event type corresponding to a state where a target event to be classified is occurring and a second event type corresponding to a state where the target event is not occurring,
- wherein out of the feature amount group used for learning on the classifier, the number of feature amounts associated with the second event type is larger than the number of feature amounts associated with the first event type,
- wherein the learning is performed by using all of the feature amounts corresponding to the first event type out of the plurality of feature amounts and using some of the feature amounts corresponding to the second event type out of the plurality of feature amounts, and
- wherein the plurality of feature amounts include at least a variance of the time-series data in the predetermined period.

12. A non-transitory storage medium storing a program that causes a computer to perform a learning method comprising:
- for each of a plurality of feature amounts obtained by converting time-series data on a predetermined period basis, acquiring training data with which an event type in the predetermined period is associated; and
- performing learning on a plurality of classifiers that are different from each other by using a feature amount group including one or more feature amounts corresponding to some or all of periods out of the plurality of feature amounts included in the training data to perform an operation of performing learning on a classifier, which classifies the event type, for multiple times while changing a combination in the feature amount group,
- wherein the event type includes a first event type corresponding to a state where a target event to be classified is occurring and a second event type corresponding to a state where the target event is not occurring, and
- wherein out of the feature amount group used for learning on the classifier, the number of feature amounts associated with the second event type is larger than the number of feature amounts associated with the first event type,
- wherein the learning is performed by using all of the feature amounts corresponding to the first event type out of the plurality of feature amounts and using some of the feature amounts corresponding to the second event type out of the plurality of feature amounts, and
- wherein the plurality of feature amounts include at least a variance of the time-series data in the predetermined period.

* * * * *